Dec. 10, 1963 W. B. REUKAUF ETAL 3,113,357
TRAILER HOUSE SKIRT
Filed Aug. 15, 1961 7 Sheets-Sheet 1

INVENTORS.
William B. Reukauf &
BY Robert T. Gallagher

Paul & Paul
ATTORNEYS.

Dec. 10, 1963  W. B. REUKAUF ETAL  3,113,357
TRAILER HOUSE SKIRT
Filed Aug. 15, 1961  7 Sheets-Sheet 2

INVENTORS.
William B. Reukauf &
BY Robert T. Gallagher,

Paul & Paul
ATTORNEYS.

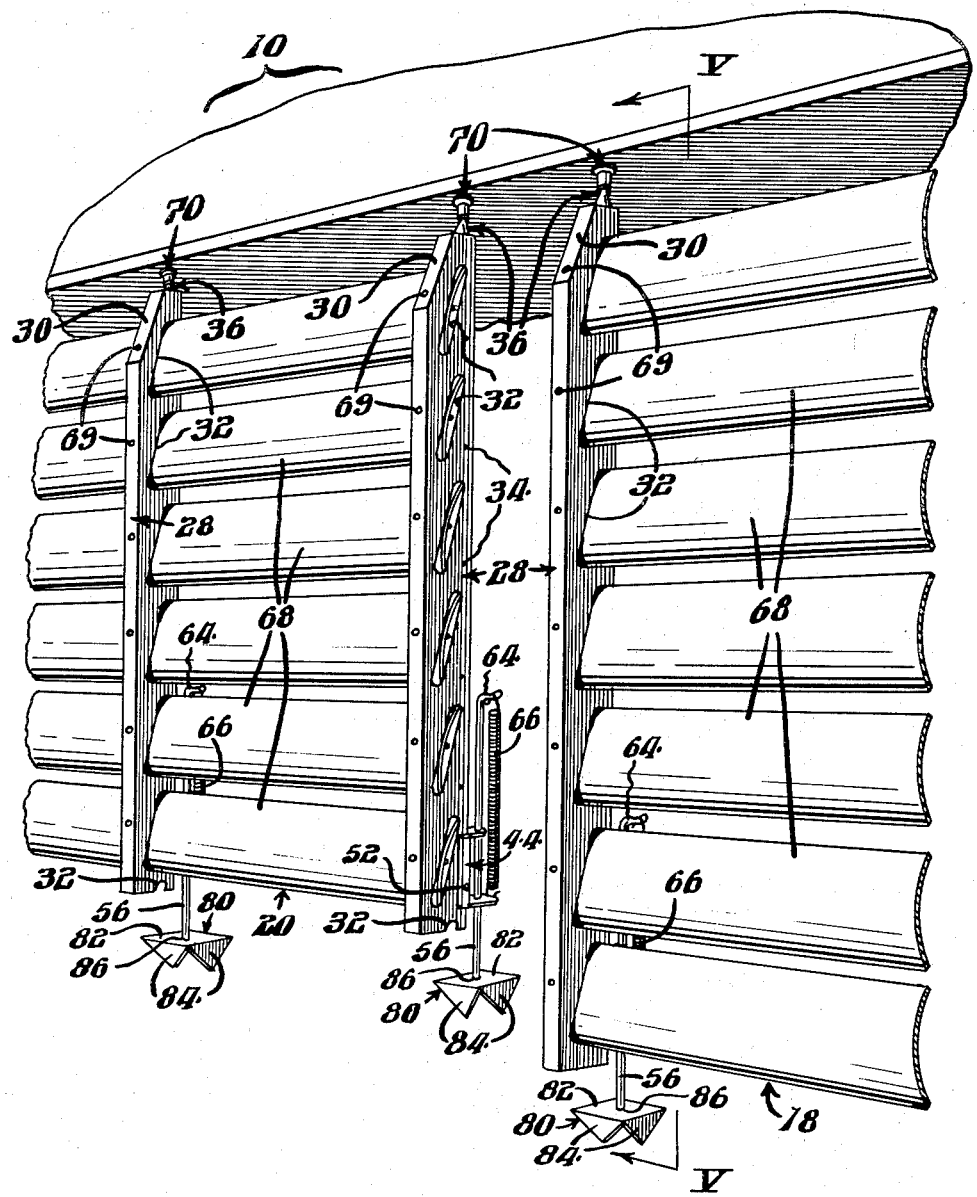

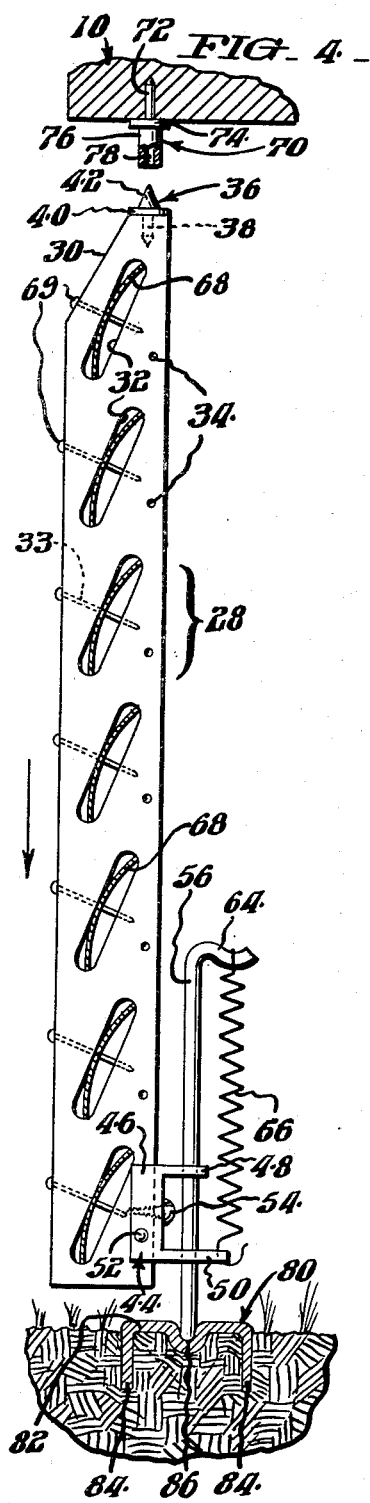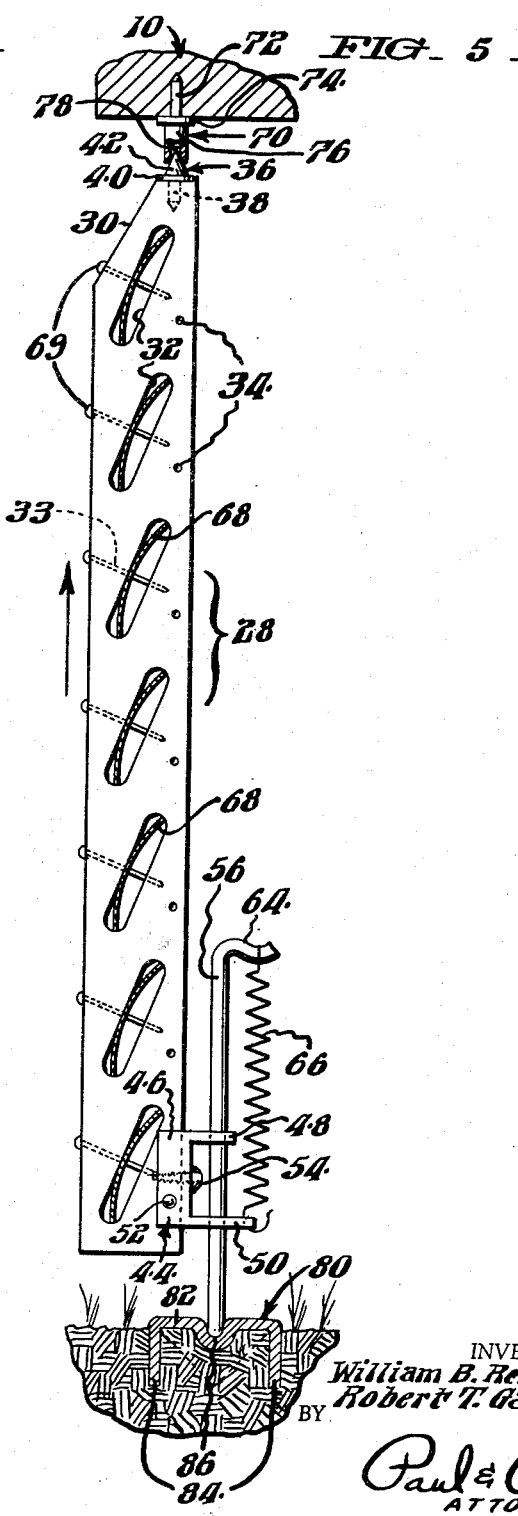

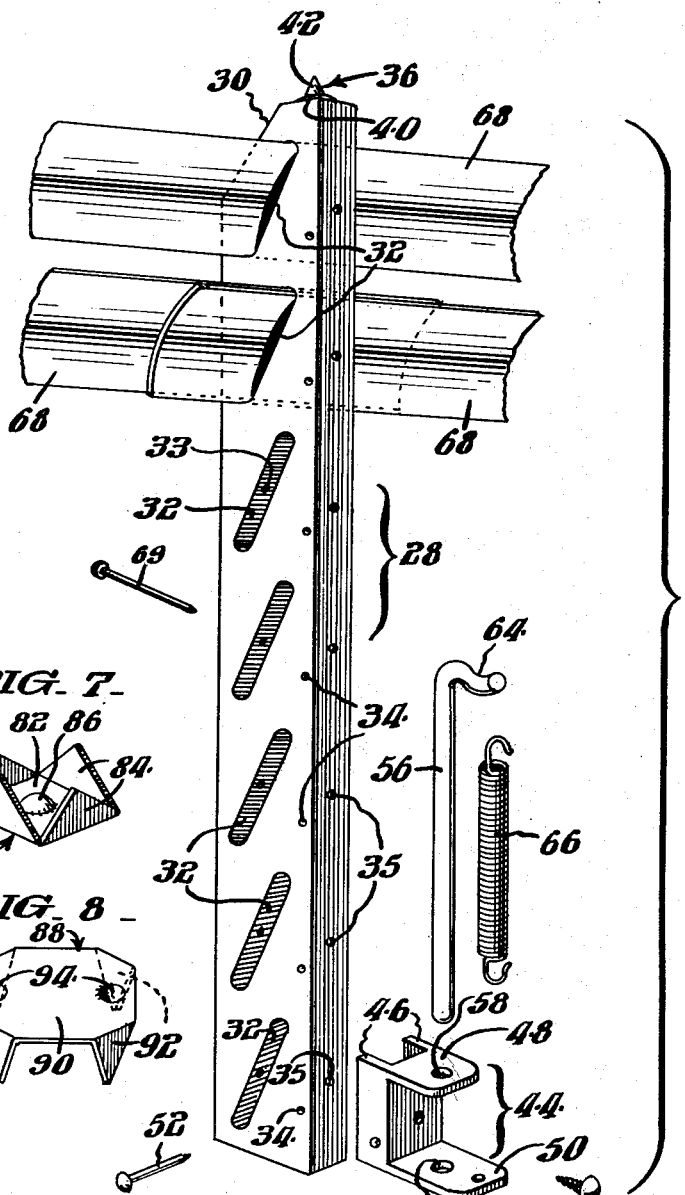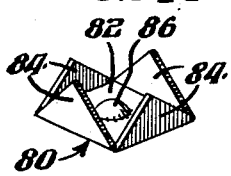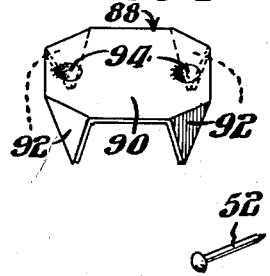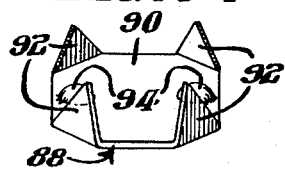

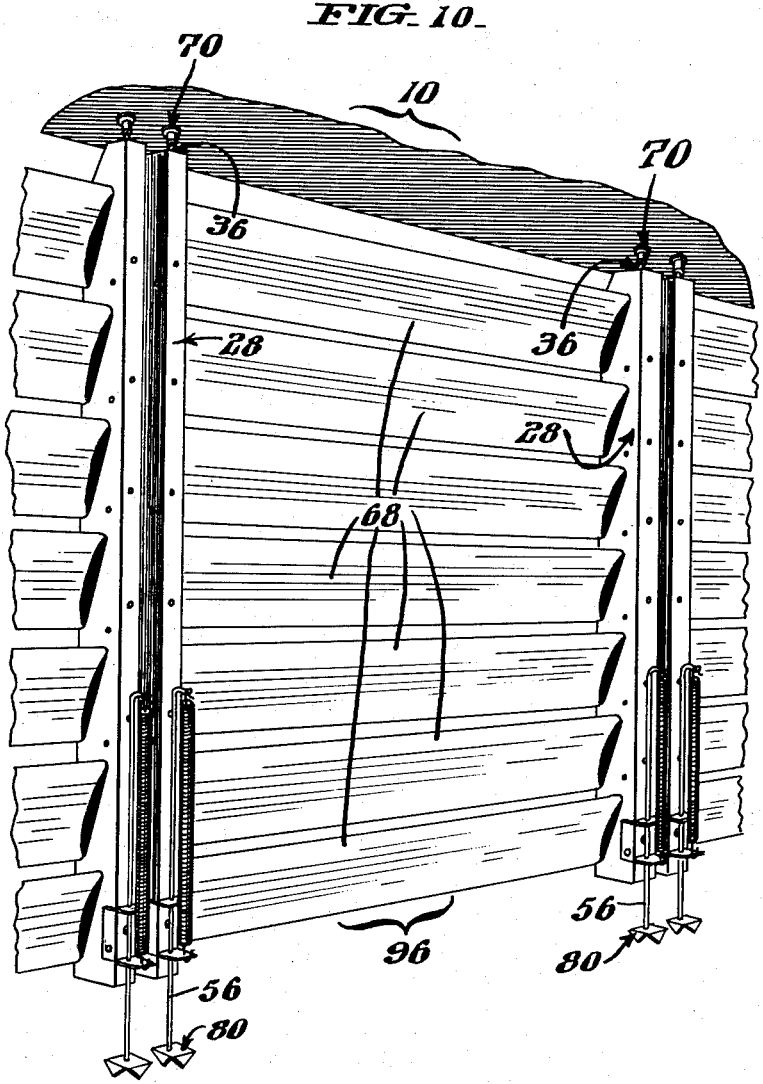

Dec. 10, 1963   W. B. REUKAUF ETAL   3,113,357
TRAILER HOUSE SKIRT
Filed Aug. 15, 1961   7 Sheets-Sheet 7
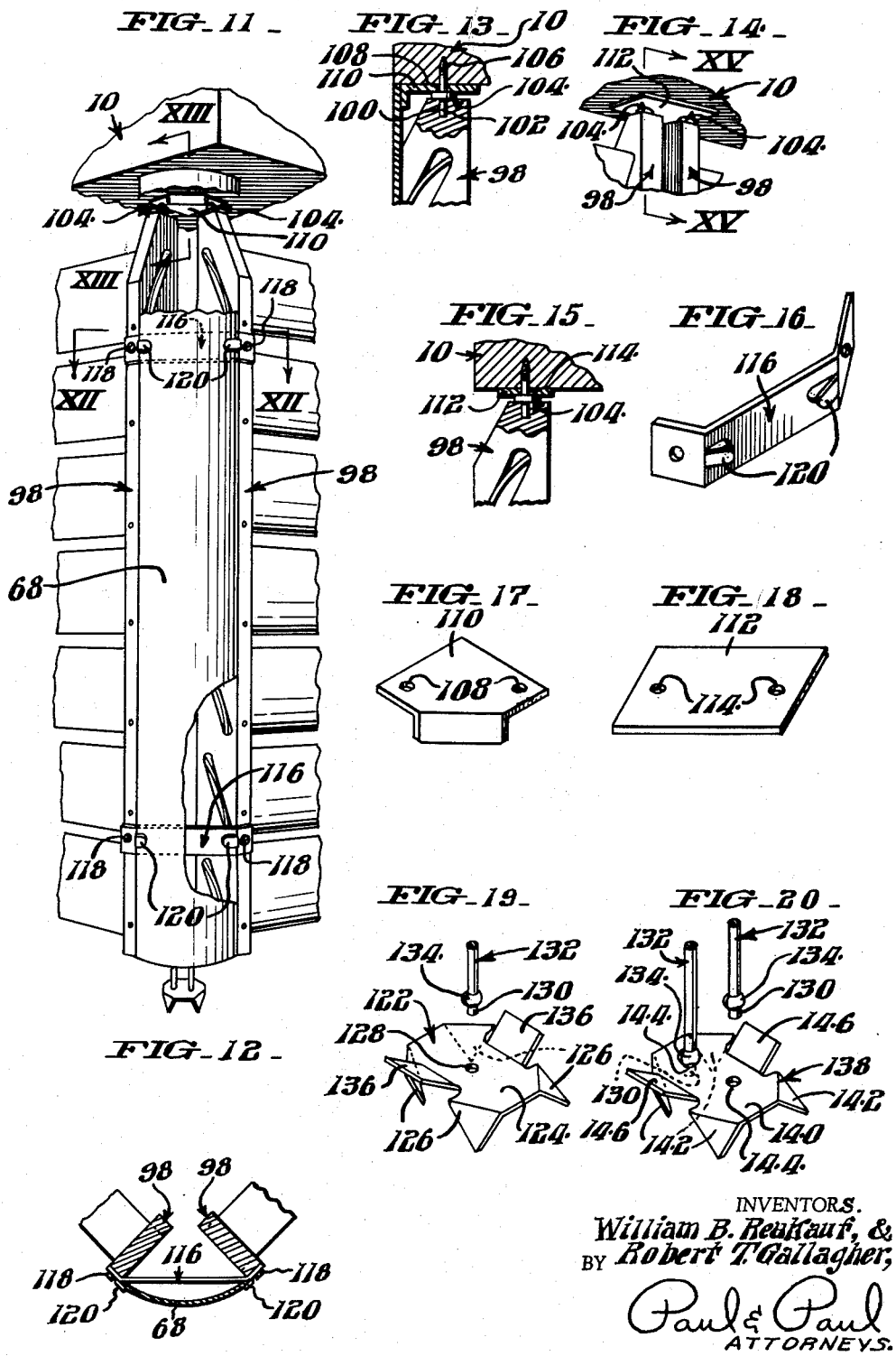
INVENTORS.
William B. Reukauf, &
BY Robert T. Gallagher,
Paul & Paul
ATTORNEYS.

United States Patent Office 3,113,357
Patented Dec. 10, 1963

3,113,357
TRAILER HOUSE SKIRT
William B. Reukauf, Haddonfield, N.J., and Robert T. Gallagher, Philadelphia, Pa., assignors to Carey-McFall Co., Philadelphia, Pa., a corporation of Pennsylvania
Filed Aug. 15, 1961, Ser. No. 131,613
2 Claims. (Cl. 20—63)

This invention relates generally to trailer houses and particularly to trailer house skirts for enclosing the space between the bottom of the trailer and the ground to protect the floor of the trailer house from drafts, provide enclosed storage area, and improve the appearance of the trailer house.

An important object of the present invention is to provide a trailer house skirt which is of simplified construction for economical manufacture, which is rugged in construction and which may be installed with maximum facility.

Another object is to provide such a trailer house skirt which is adjustable in height to accommodate a sloping ground surface.

Another object is to provide such a trailer house skirt which may be readily installed on various types and sizes of trailers.

Another object is to provide such a trailer house skirt with means for effectively gripping the ground, whether or not the same is paved.

Another object is to provide such a trailer house skirt which cannot buckle when the ground heaves.

Other objects of the invention will become apparent when the following description is read with reference to the accompanying drawings, in which:

FIG. 3 is a perspective view showing skirt sections coming together on the side of the trailer house, the sections being shown farther apart than they would be placed in actual practice;

FIG. 4 is a section on line V—V in FIG. 3, but shows the post depressed and its upper end aligned for connection with the bottom of the trailer house;

FIG. 5 is a section on line V—V in FIG. 3;

FIG. 6 is an exploded perspective view of a typical post;

FIG. 7 is a perspective view looking at the bottom of a typical shoe plate;

FIG. 8 is a perspective view of a corner shoe plate;

FIG. 9 is a perspective view looking at the bottom of the corner shoe plate in FIG. 8;

FIG. 10 is a perspective view looking at the back of a door section of the skirt;

FIG. 11 is a perspective view of a modified corner construction;

FIGS. 12 and 13 are sections respectively on lines XII—XII and XIII—XIII in FIG. 11;

FIG. 14 is a perspective view showing a modified arrangement at the heads of close adjacent posts;

FIG. 15 is a section on line XV—XV in FIG. 14;

FIG. 16 is a perspective view of a corner bracket;

FIG. 17 is a perspective view of the washer plate shown in FIG. 11 at the heads of the corner posts;

FIG. 18 is a perspective view of the washer plate shown in FIG. 14 at the heads of the posts; and FIGS. 19 and 20 are exploded perspective views of modified arrangements for anchoring the posts.

Figure 1:
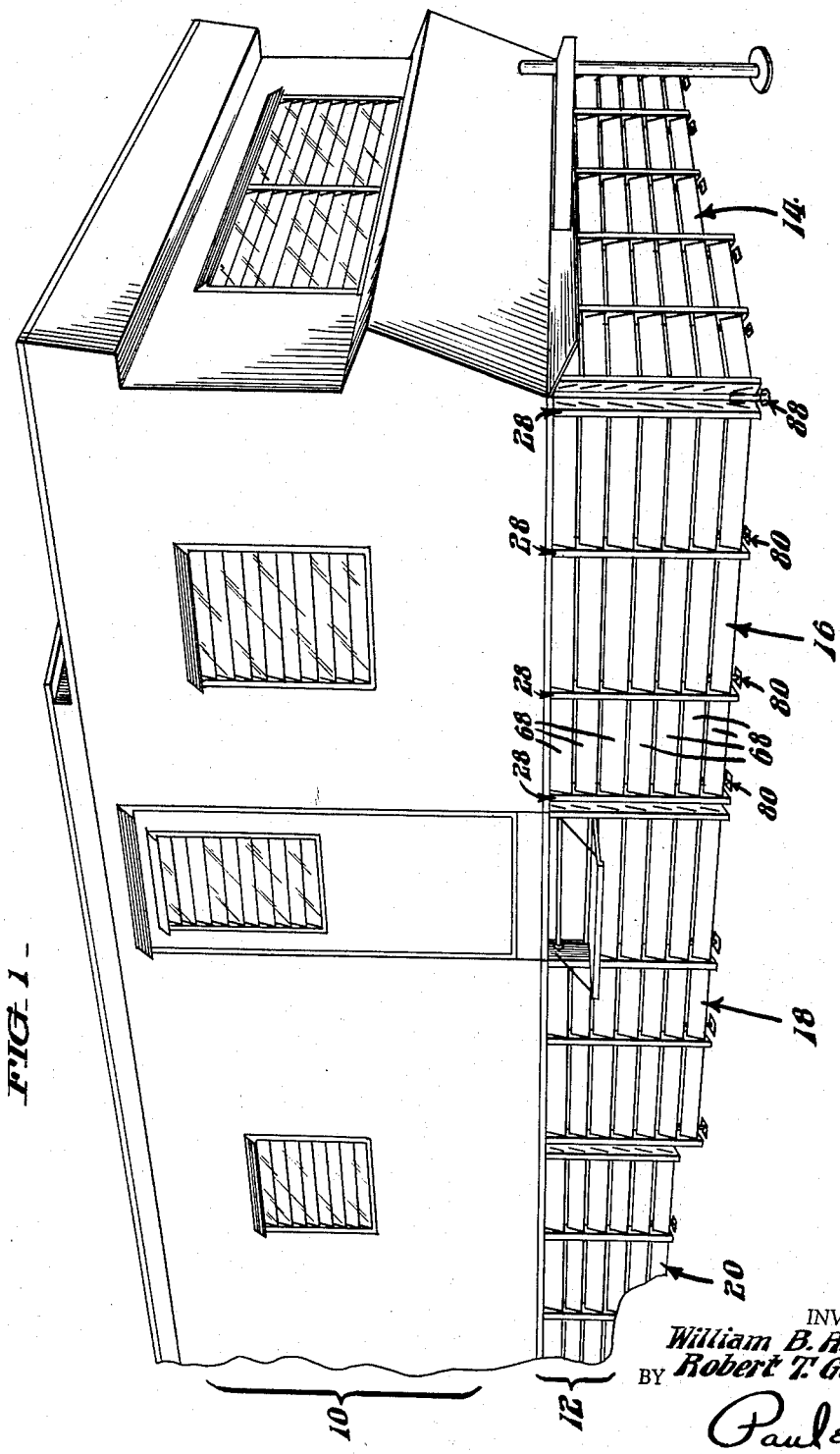
FIG. 1 is a perspective view of a trailer house embodying the invention.

Referring particularly to FIG. 1, a typical trailer house immobilized for use as living quarters is generally designated 10. The trailer house is equipped with a skirt, generally designated 12, comprising one section 14 preferably extending all the way across the front of the trailer house and several sections 16, 18, and 20 conjointly extending all the way along one side of the trailer house.

Referring particularly to FIGS. 4 and 6, a typical post, generally designated 28, preferably is made of a length of wood, for example, redwood, rectangular in transversed section. The front of the post, at the top thereof, may be beveled, as at 30. The post is provided with a series of elongated parallel through openings 32 longitudinally equally spaced. The openings 32 are inclined, as shown, and extending into the front of the post, normal to the openings 32, are longitudinally equally spaced predrilled nail holes 33. On each side of the post, proximate the rear thereof, are longitudinally equally spaced predrilled nail holes 34. In the rear face of the post are a series of longitudinally equally spaced predrilled screw holes 35. One predrilled hole 33, two predrilled holes 34, and one predrilled hole 35 are associated with each opening 32.

At the top of the post is a pin, generally designated 36. One end 38 of the pin is driven into, and a shoulder 40 engages, the top of the post. The opposite end 42 of the pin extends upwardly from the top of the post.

At the lower end of the post is a sheet metal bracket, generally designated 44, provided with opposite side flanges 46 respectively engaging opposite sides of the post. The upper and lower ends of the brackets are turned away from the post to provide ears 48 and 50. The bracket is secured to the post by means of nails 52 projected through the flanges 46 and into the two lowermost openings 34, and by a screw 54 projected through the bracket and turned into the lowermost opening 35. The ears 48 and 50 are provided respectively with openings 58 and 60, which slidably receive a rod 56 extending downwardly below the main body of the post. The upper end of the rod is hooked, as at 64, for connection to the upper end of a tension spring 66. The lower end of the tension spring is anchored to the ear 50 of the bracket 44.

Each section is provided with a series of louver boards 68 preferably made of resilient flexible sheet metal, for example, spring tempered Alcoa aluminum, three inches wide and arcuate in transversed section.

Each skirt section comprises two or more posts and an array of louver boards. For example, the skirt section 16 includes a pair of end posts 28 and a pair of intermediate posts 28, the posts being spaced approximately 24 inches apart. In addition, the section 16 comprises a series of louver boards 68. Each louver board extends through corresponding openings 32 in the several posts and is affixed to the posts by nails 69 driven into the front face of the post through predrilled holes 33. Each louver board may extend in one length from end to end of the section. However, if desired, shorter lengths may be used and overlapped at an intermediate post 28, as suggested in FIG. 6.

Carried by the undersurface of the trailer house are pins, generally designated 70. One end 72 of the pin is driven into the bottom of the trailer house, and a shoulder 74 butts the undersurface of the trailer house. Depending from the shoulder 74 is a head 76 provided with an axially extending central opening 78.

At the foot of each post, except for the corner posts, is a ground anchor or shoe plate, generally designated 80, provided with a rectangular main body 82 and triangular flanges 84. A central area of the main body 82 is depressed, as at 86.

Figure 2:
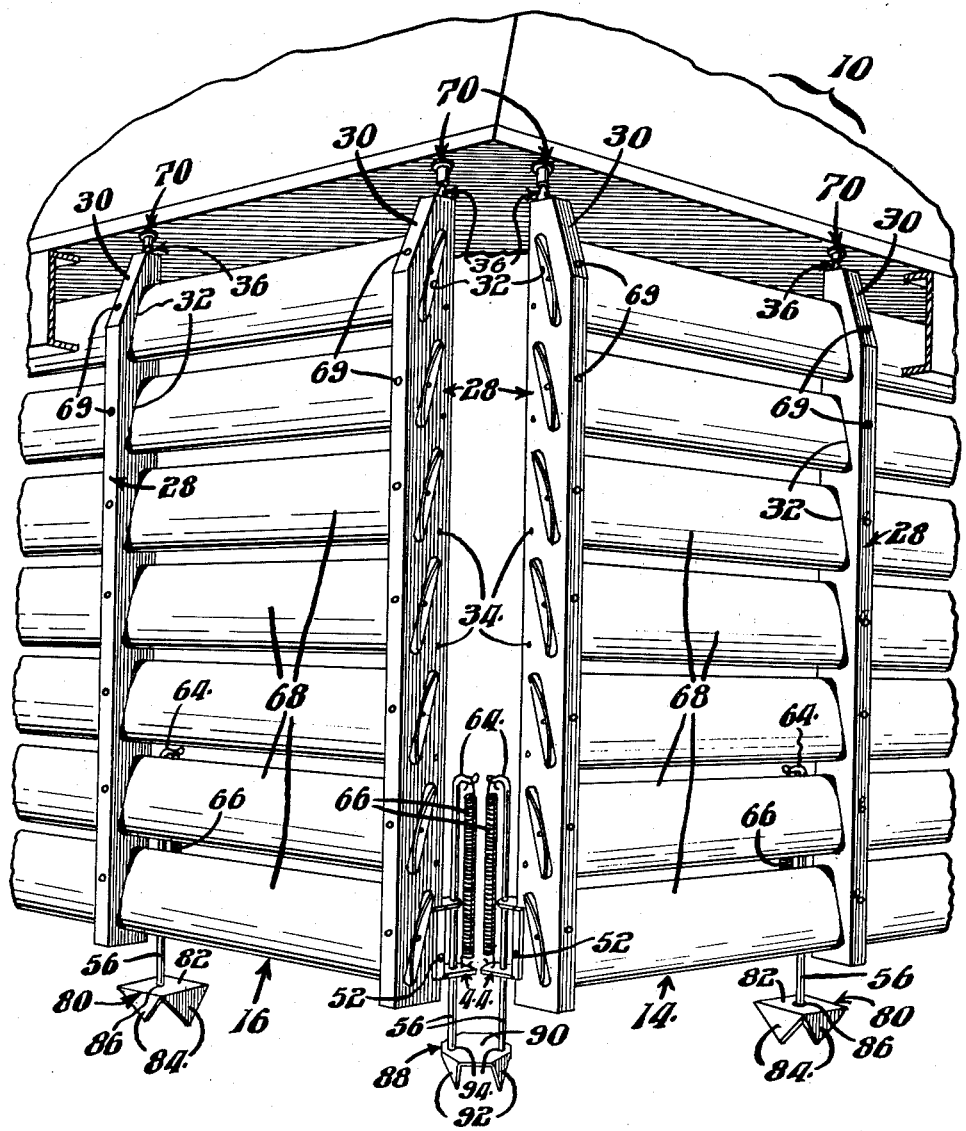
FIG. 2 is a perspective view showing skirt sections coming together at a corner of the trailer house.

Referring particularly to FIGS. 2, 8, and 9, a corner shoe plate, generally designated 88, is provided with an octagonal main body 90 and four triangular flanges 92. The body 90 is provided with a pair of depressions 94.

The skirt 12 normally is shipped to the trailer house owner by the manufactured in knocked-down condition. In the erection of the skirt, and particularly sections 14 and 16 thereof, for example, first the pins 70 are located and driven into the undersurface of the immobilized and leveled trailer house. Along the front and side of the trailer house the several pins 70 are arranged in two straight lines respectively set back from the front and side of the trailer house suitable distances. The two pins 70 at the corner of the trailer house are spaced from each other a predetermined distance required for erection of the corner posts 28 parallel to each other. The several pins 70 along the front of the trailer house are placed approximately 24 inches apart, and the several pins 70 along the side of the trailer house, for the section 16, are spaced approximately 24 inches apart. Now the two corner posts are erected.

The posts are furnished in standard lengths. If a selected post is too long, it is sawed off about one-half inch below a selected opening 34. Then the post is fitted with its bracket 44 and associated rod 56 and spring 66. The ground anchor 88 is then positioned on the ground under the two corner pins 70. The lower end of the rod 56 of each post is placed in one of the depressions 94 in the plate 88. Then the post is depressed against the influence of the spring 66, whereupon the top of the post is positioned so that the end 42 of the pin at the top of the post registers with the opening 78 in the overlying pin 70. Then the post is released, whereupon it moves upwardly under the influence of spring 66 so that the end 42 of the pin 36 is projected into the opening 78 of the pin 70. Now the two corner posts may be positioned in a true upright position, which is accomplished by shifting the plate 88 as may be required. The intermediate posts 28 are now erected by following essentially the same procedure as outlined above, but using ground anchors 80 at the bottoms of the posts instead of a ground anchor 88. Thus, the tops of the posts are quick-detachably secured in position, as shown in FIGS. 2-5. The rods 56 acting upon the underlying shoe plates 88 and 80 force the sharp points of the triangular flanges of the shoe plates to grip the ground. The posts along the front of the trailer are now fitted with louver boards 68.

Preferably these boards are of a standard length, for example, six feet three inches long, in consequence of which each board may span the panels each 24 inches wide. It will be noted that the lowermost louver board spans only two panels, which means that a louver board of standard length is cut to suit. Each of the other louver boards is made up of two louver boards overlapped at one of the posts 28 to effectively make up on louver board spanning all five panels of the section 14. The posts of section 16 are now fitted with louver boards 68.

In this case, each board is of a full standard length.

In order to secure the louver boards in position, nails 69 are projected through openings 33 in the front of the posts and through the louver boards 68, as shown.

It will be evident by comparing the depth of the panels at the left end of section 14 with that of the panels on the right end of section 14 that the ground under the right end of the section is higher than the ground under the left end of the section. Thus it may be necessary to make some of the posts of a section shorter than others.

It will also be evident by comparing the depth of section 20 with that of sections 18 and 16 that the ground under section 20 is higher than the ground under sections 18 and 16. Thus it may be necessary to make all of the posts of a section shorter than the posts of another section.

For purposes of illustration only, the front of the skirt 12 is described as consisting of one section 14, and the side of the skirt 12 is described as consisting of several sections 16, 18, and 20, but it will be understood that the front, back and each side of the skirt may each be made in one or a plurality of sections, as desired.

Preferably two sections are provided to serve as doors for access to the space under the trailer house floor. Each door is simply a short skirt section perhaps 24 to 30 inches long desirably located near the sanitary piping or the main entrance of the trailer house. Referring particularly to FIG. 10, such a door, generally designated 96, is in every respect similar to the skirt section 16, except that the intermediate posts are omitted and the louver boards 68 are cut to the required shorter length.

It will be noted that throughout the skirt adjacent sections thereof are not connected together, but on the contrary are separated by a short distance. To remove the door 96, therefore, its two posts 28 are forced downwardly against the action of the pressure rods 56 to disengage the pins 36 from the pins 70. Then the upper ends of the posts are moved outwardly from under the trailer house, whereupon the door may be lifted from the ground anchors 80 and set aside. The same procedure, but in reverse order, is followed to replace the door.

While it is preferred that the skirt be shipped in knocked-down condition and assembled in the field, it may, under special circumstances be shipped in preassembled condition, i.e., in sections convenient to handle and erect.

Referring particularly to FIGS. 11, 13, and 17, the modified corner arrangement includes a pair of corner posts 98 similar to corner posts 28. However, in the top of each post 98 is a hole 100 for receiving the exposed end 102 of a gudgeon pin, generally designated 104, the pointed end 106 of which is projected through a hole 108 in a washer plate 110 and driven into the bottom of the trailer house. The holes 108 in the plate 110 are spaced from each other a predetermined distance so that the plate facilitates erection of the corner posts. The heads of other posts are similarly provided with holes for receiving gudgeon pins projected through holes in suitable washers and driven into the bottom of the trailer house. For example, referring particularly to FIGS. 14, 15 and 18, at the heads of two close adjacent end posts 98 a rectangular washer 112 provided with holes 114 is used advantageously.

Referring particularly to FIGS. 11, 12, and 16, the appearance of the skirt may be materially improved by covering the exposed ends of the sections. To accomplish this, the corner posts 98 are provided with a pair of vertically spaced brackets, generally designated 116, each extending horizontally from post to post and secured to the posts by screws 118. Each bracket 116 is provided with a pair of struck out tabs 120 and mounted upon the brackets is a vertically extending louver board 68, sprung between the tabs 120 and held thereby in position. The upper end of the louver board 68 overlies a flange 121 depending from the washer plate 110.

Referring particularly to FIG. 19, the modified ground anchor or shoe plate for use under all posts except corner posts, generally designated 122, comprises a main body part 124 and a plurality of triangular flanges 126. A central area of the main body 124 is apertured, as at 128, for receiving the lower terminal portion 130 of a pressure rod 132 upset, as at 134. The ground anchor 122 is provided with a pair of inclined ears 136, which facilitate lifting the ground anchor against the influence of the overlying pressure rod.

Referring particularly to FIG. 20, the modified ground anchor or shoe plate for use at a corner of the skirt, generally designated 138, comprises a main body part 140 and a plurality of triangular flanges 142. The main body 140 is provided with a pair of apertures 144, each for receiving the lower terminal portion 130 of a pressure rod 132 upset, as at 134. The ground anchor 138 is provided with a pair of inclined ears 146, which facilitate lifting the ground anchor against the influence of the overlying pressure rods.

It will be understood, of course, that the present invention, as described and shown, is susceptible to various changes and modifications that may be made without any departure from the general principles or real spirit of the invention. Accordingly, it is intended to claim the present invention broadly, as well as specifically, as indicated in the appended claims.

Having thus described our invention, we claim as follows:

1. In a skirt for screening the space between the ground and a structure elevated above the ground and having a horizontally extending undersurface overlying the line of said skirt, the combination comprising a plurality of upright post members distributed along said skirt line, means at the foot of said posts for engaging with the ground and biasing said posts upwardly into engagement with said horizontally extending undersurface overlying the line of said skirt, each last mentioned means being independently self-adjusting for effectively accommodating the associated post to the contour of the ground, each of said posts being provided with a series of longitudinally spaced openings, louver boards carried by said posts, each of said louver boards being threaded through aligned ones of said openings respectively in said posts, said louver boards being operative to conjointly screen from view the space aforesaid throughout the length of said skirt, a pair of close adjacent posts at a corner of said skirt, respectively associated with the skirt sections meeting to form said corner, said posts each being spaced a substantial distance from the line of the skirt section of which the other forms a part, and an upright louver board mounted between said close adjacent posts to screen the ends of said skirt sections.

2. In a skirt for screening the space between the ground and a structure elevated above the ground and having a horizontally extending undersurface overlying the line of said skirt, the combination comprising a plurality of upright post members distributed along said skirt line, means at the foot of said posts for engaging with the ground and biasing said posts upwardly into engagement with said horizontally extending undersurface overlying the line of said skirt, each last mentioned means being independently self-adjusting for effectively accommodating the associated post to the contour of the ground, each of said posts being provided with a series of longitudinally spaced openings, louver boards carried by said posts, each of said louver boards being threaded through aligned ones of said openings respectively in said posts, said louver boards being operative to conjointly screen from view the space aforesaid throughout the length of said skirt, a pair of close adjacent posts at a corner of said skirt, respectively associated with the skirt sections meeting to form said corner, said posts each being spaced a substantial distance from the line of the skirt section of which the other forms a part, a pair of vertically spaced brackets affixed to said posts and carrying horizontally spaced louver board retaining elements, and an upright louver board overlying and sprung between said elements to screen the ends of said skirt sections.

References Cited in the file of this patent

UNITED STATES PATENTS

| | | |
|---|---|---|
| 1,311,398 | Hester | July 29, 1919 |
| 2,210,624 | Kramer | Aug. 6, 1940 |
| 2,456,058 | Goldthwaite | Dec. 14, 1948 |
| 2,846,735 | Zeimet | Aug. 12, 1958 |
| 2,961,255 | Trott | Nov. 22, 1960 |